US011882328B2

(12) United States Patent
Monaghan et al.

(10) Patent No.: US 11,882,328 B2
(45) Date of Patent: Jan. 23, 2024

(54) PROACTIVELY IDENTIFYING CABLE NETWORK IMPAIRMENTS BASED ON TELEMETRY DATA FROM CUSTOMER-PREMISES EQUIPMENT (CPE) DEVICES

(71) Applicant: Charter Communications Operating, LLC, St. Louis, MO (US)

(72) Inventors: Thomas Monaghan, Fairfield, CT (US); Mark Quirk, Washingtonville, NY (US); Shaun Leggio, Shirley, NY (US); Sakarin Seedasome, Riverside, CT (US); Thomas Tomesco, Fair Lawn, NJ (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/153,385

(22) Filed: Jan. 20, 2021

(65) Prior Publication Data
US 2022/0232285 A1 Jul. 21, 2022

(51) Int. Cl.
*H04N 21/239* (2011.01)
*H04N 21/466* (2011.01)
*H04N 21/238* (2011.01)
*H04N 21/24* (2011.01)

(52) U.S. Cl.
CPC ......... *H04N 21/239* (2013.01); *H04N 21/238* (2013.01); *H04N 21/2408* (2013.01); *H04N 21/4665* (2013.01)

(58) Field of Classification Search
CPC ............... H04N 21/239; H04N 21/238; H04N 21/2408; H04N 21/4665
See application file for complete search history.

(56) References Cited

U.S. PATENT DOCUMENTS

| 10,958,485 B1* | 3/2021 | Gotwals | H04L 27/265 |
| 10,963,333 B1* | 3/2021 | Nijim | G06F 11/079 |
| 2009/0125608 A1* | 5/2009 | Werth | G06Q 10/103 709/218 |

(Continued)

*Primary Examiner* — Jefferey F Harold
*Assistant Examiner* — Alexander Boyd
(74) *Attorney, Agent, or Firm* — Dority & Manning, P.A.

(57) ABSTRACT

Proactively identify cable network impairments based on telemetry data from customer-premises equipment (CPE) devices is disclosed. In some embodiments, a maintenance service retrieves telemetry parameters from CPE devices at a customer site communicatively coupled to a cable network infrastructure. The maintenance service analyzes the telemetry parameters to detect cable network impairments experienced by the CPE devices at the customer site (based on, e.g., whether a telemetry parameter from any CPE devices fails a corresponding telemetry threshold, whether the same telemetry failure is experienced by all CPE devices at the customer site, whether other neighboring customer sites also experience the same failure on all CPE devices, and/or whether a high post main tap (HPMT) parameter and an HPMT magnitude (HPMTM) parameter for the customer site fail corresponding thresholds, according to some embodiments). The maintenance service then assigns a maintenance classification that indicates a recommended service technician type for the customer site.

6 Claims, 5 Drawing Sheets

(56) References Cited

U.S. PATENT DOCUMENTS

| | | | | |
|---|---|---|---|---|
| 2013/0103822 A1* | 4/2013 | Wolcott | ............... | G06F 1/28 |
| | | | | 709/224 |
| 2014/0369208 A1* | 12/2014 | Voshi | ............... | H04L 12/2801 |
| | | | | 370/242 |
| 2017/0230211 A1* | 8/2017 | Teflian | ............... | H04B 10/60 |
| 2020/0186440 A1* | 6/2020 | Towfiq | ............... | H04L 41/5009 |
| 2022/0182254 A1* | 6/2022 | Yates | ............... | H04N 21/251 |

* cited by examiner

PROACTIVELY IDENTIFYING CABLE NETWORK IMPAIRMENTS BASED ON TELEMETRY DATA FROM CUSTOMER-PREMISES EQUIPMENT (CPE) DEVICES

BACKGROUND

The proliferation of cable networks and the services provided by cable networks (such as telephony, data transmission, video conferencing, telemedicine, remote education, and the like) has resulted in a greater demand for high levels of reliability and availability. In particular, a multiple-system operator (MSO) that provides or supports customer-premises equipment (CPE) devices (e.g., cable boxes, cable modems, routers, and the like) may require efficient mechanisms for identifying cable network impairments and appropriate responsive actions in order to maintain desired levels of service.

SUMMARY

The embodiments disclosed herein proactively identify cable network impairments based on telemetry data from customer-premises equipment (CPE) devices. In some embodiments, a maintenance service of a computing device retrieves telemetry parameters, such as Data Over Cable Service Interface Specification (DOCSIS) telemetry data, from CPE devices at a customer site communicatively coupled to a cable network infrastructure. The maintenance service analyzes the telemetry parameters to detect and evaluate any cable network impairments experienced by the CPE devices at the customer site (based on, e.g., whether a telemetry parameter from any CPE devices fails a corresponding telemetry threshold, whether the same telemetry failure is experienced by all CPE devices at the customer site, whether other neighboring customer sites also experience the same failure on all CPE devices, and/or whether a high post main tap (HPMT) parameter and an HPMT magnitude (HPMTM) parameter for the customer site fail corresponding thresholds, according to some embodiments). The maintenance service then assigns a maintenance classification that indicates a recommended service technician type for the customer site.

In another embodiment, a method is provided. The method comprises retrieving, by a maintenance service of a computing device, a plurality of telemetry parameters from each CPE device of a plurality of CPE devices of a customer site communicatively coupled to a cable network infrastructure. The method further comprises performing an analysis of the plurality of telemetry parameters from each CPE device of the plurality of CPE devices, wherein performing the analysis comprises performing a first determination of whether a telemetry parameter of the plurality of telemetry parameters for a CPE device of the plurality of CPE devices fails a corresponding telemetry threshold, and performing a second determination of whether the telemetry parameter fails the corresponding telemetry threshold for all CPE devices of the plurality of CPE devices. The method also comprises, based on the analysis, assigning a maintenance classification that indicates a recommended service technician type for the customer site.

In another embodiment, a computing device is provided. The computing device comprises a system memory, and a processor device communicatively coupled to the system memory. The processor device is configured to retrieve a plurality of telemetry parameters from each CPE device of a plurality of CPE devices of a customer site communicatively coupled to a cable network infrastructure. The processor device is further configured to perform an analysis of the plurality of telemetry parameters from each CPE device of the plurality of CPE devices by being configured to perform a first determination of whether a telemetry parameter of the plurality of telemetry parameters for a CPE device of the plurality of CPE devices fails a corresponding telemetry threshold, and perform a second determination of whether the telemetry parameter fails the corresponding telemetry threshold for all CPE devices of the plurality of CPE devices. The processor device is also configured to, based on the analysis, assign a maintenance classification that indicates a recommended service technician type for the customer site.

In another example, a computer program product is provided. The computer program product is stored on a non-transitory computer-readable medium, and includes computer-executable instructions that, when executed, cause a processor device of a computing device to retrieve a plurality of telemetry parameters from each CPE device of a plurality of CPE devices of a customer site communicatively coupled to a cable network infrastructure. The computer-executable instructions further cause the processor device to perform an analysis of the plurality of telemetry parameters from each CPE device of the plurality of CPE devices by causing the processor device to perform a first determination of whether a telemetry parameter of the plurality of telemetry parameters for a CPE device of the plurality of CPE devices fails a corresponding telemetry threshold, and perform a second determination of whether the telemetry parameter fails the corresponding telemetry threshold for all CPE devices of the plurality of CPE devices. The computer-executable instructions also cause the processor device to, based on the analysis, assign a maintenance classification that indicates a recommended service technician type for the customer site.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
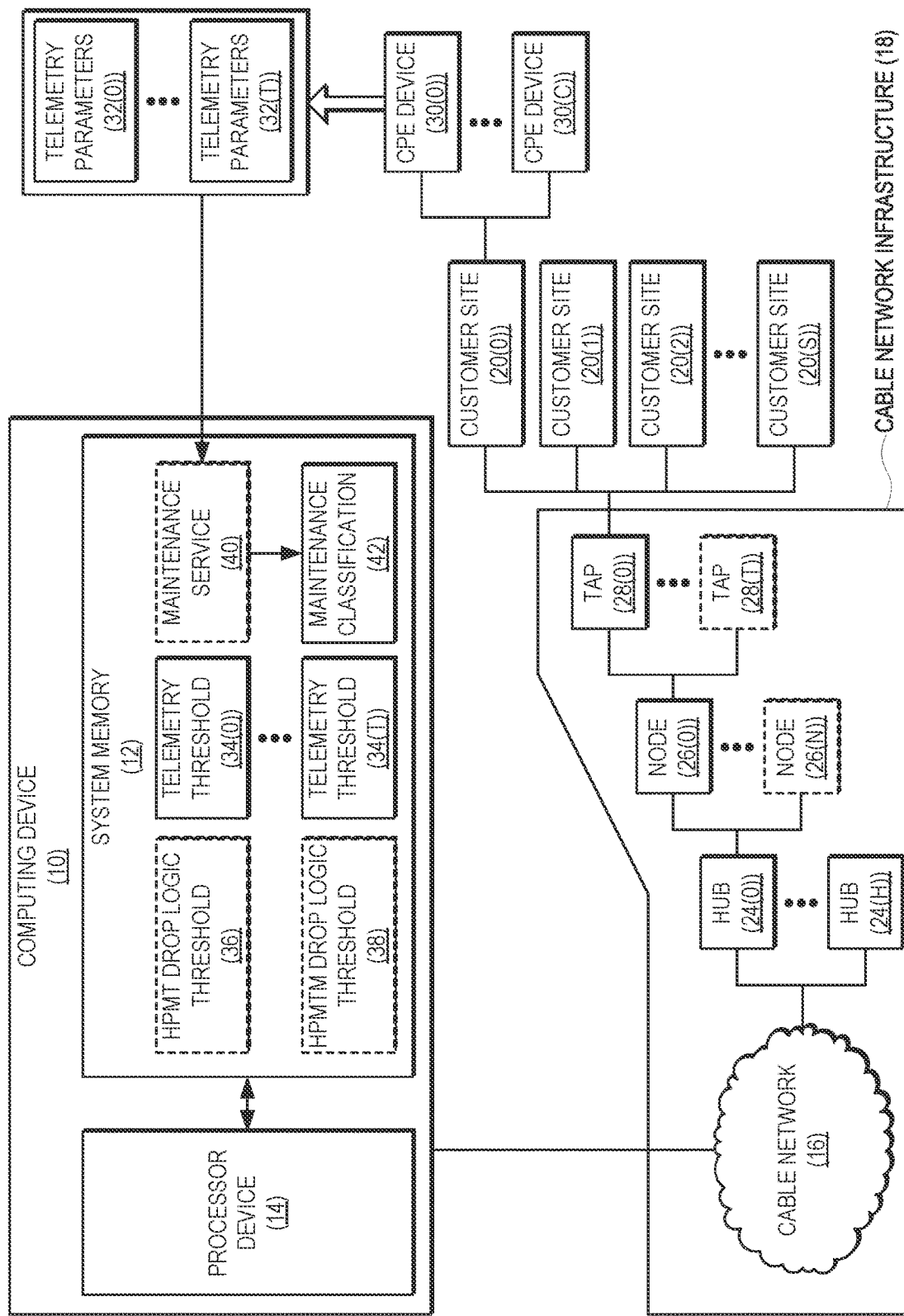
FIG. 1 is a block diagram illustrating an exemplary cable network infrastructure and an exemplary computing device configured to proactively identify cable network impairments within the cable network infrastructure based on telemetry data from customer-premises equipment (CPE) devices, in accordance with some embodiments.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As noted above, the proliferation of cable networks and the services provides thereby (e.g., telephony, data transmission, video conferencing, telemedicine, remote education, and the like) has resulted in a greater demand for high levels of reliability and availability. In particular, a multiple-system operator (MSO) that provides or supports customer-premises equipment (CPE) devices (e.g., cable boxes, cable modems, routers, and the like) may require efficient mechanisms for identifying cable network impairments and appropriate responsive actions in order to maintain desired levels of service.

In this regard, embodiments disclosed herein proactively identify cable network impairments based on telemetry data from CPE devices. The term "impairment" and derivatives thereof are used herein to refer to any issues that may negatively affect the transmission of signals to and from CPE devices on a cable network. In one embodiment, a maintenance service of a computing device retrieves telemetry parameters from CPE devices at a customer site communicatively coupled to a cable network infrastructure. The maintenance service may be operated by, e.g., an MSO, and the telemetry parameters may comprise Data Over Cable Service Interface Specification (DOCSIS) telemetry data. The telemetry parameters in some embodiments may include a downstream receive (RX) level parameter, a downstream uncorrectable parameter, a downstream Modulation Error Ratio (MER) parameter, a high post main tap (HPMT) parameter, an HPMT magnitude (HPMTM) parameter, an upstream uncorrectable parameter, an upstream transmit (TX) level parameter, a ripple parameter, a Full Band Capture (FBC) parameter, an Orthogonal Frequency Division Multiplexing (OFDM) parameter, an Orthogonal Frequency Division Multiple Access (OFDMA) parameter, a T3 timeout parameter, and a T4 timeout parameter, as non-limiting examples.

The maintenance service performs an analysis of the telemetry parameters to detect and evaluate any cable network impairments experienced by the CPE devices at the customer site. Based on the analysis, the maintenance service assigns a maintenance classification that indicates a recommended service technician type for the customer site. In this manner, the MSO can proactively dispatch an appropriate service technician to the customer site to correct any cable network impairments without any action required on the part of the customer. In particular, the MSO can determine whether a fulfillment technician (who addresses individual issues at the customer site) or a maintenance technician (who addresses issues with the cable network infrastructure that affects multiple customer sites) is more appropriate based on the analysis.

The analysis of the telemetry parameters may follow a logical flow that first involves making a first determination regarding whether a telemetry parameter retrieved for the CPE devices at the customer site fails a corresponding telemetry threshold. The telemetry threshold may specify, for example, a minimum or maximum acceptable value for the corresponding telemetry parameter, or may specify an acceptable range of values for the corresponding telemetry parameter. If the first determination evaluates to false, then the customer site is assigned a no service required maintenance classification to indicate that no service call is required. If the telemetry parameter does fail the corresponding telemetry threshold (i.e., the first determination evaluates to true), the maintenance service next makes a second determination regarding whether the telemetry parameter fails the corresponding telemetry threshold for all CPE devices at the customer site. If the second determination evaluates to false (i.e., if not all CPE devices experience the same issue with the telemetry parameter), then the maintenance service in some embodiments assigns a partial home maintenance classification to indicate that a fulfillment technician is recommended for the customer site.

According to some embodiments, if the second determination indicates that the telemetry parameter does fail the corresponding telemetry threshold for all CPE devices at the customer site (i.e., the second determination evaluates to true), the maintenance service next performs a third determination and a fourth determination. The third determination involves determining whether the telemetry parameter fails the corresponding telemetry threshold for all CPE devices of one or more neighboring customer sites on a same infrastructure node as the customer site. The one or more neighboring customer sites may comprise, e.g., customer sites that are within a specified proximity of the customer site being evaluated by the maintenance service. If the third determination evaluates to true, a plant issue maintenance classification is assigned to indicate that a maintenance technician is recommended for the cable network infrastructure. If the third determination indicates that there are not one or more neighboring customer sites on the same infrastructure node for which the telemetry parameter fails the corresponding telemetry threshold for all CPE devices (i.e., the third determination evaluates to false), the maintenance service in some embodiments assigns a whole home maintenance classification to indicate that a fulfillment technician is recommended for the customer site.

The fourth determination involves determining whether an HPMT telemetry parameter for the customer site fails an HPMT drop logic threshold, and an HPMTM telemetry parameter for the customer site fails an HPMTM drop logic threshold. The HPMT drop logic threshold and the HPMTM drop logic threshold are used as part of "drop logic" that is used to determine whether a cable network impairment is within the customer site, is between the customer site and the cable network infrastructure, or within the cable network infrastructure itself. If the fourth determination indicates that the HPMT telemetry parameter fails the HPMT drop logic threshold and the HPMTM telemetry parameter fails the HPMTM drop logic threshold, the maintenance service according to some embodiments assigns a drop issue maintenance classification to indicate that a fulfillment technician is recommended for the customer site (i.e., to address the cable network impairment between the customer site and the cable network infrastructure). Otherwise, the maintenance service in some embodiments assigns the whole home maintenance classification to indicate that a fulfillment technician is recommended for the customer site (i.e., to address the cable network impairment within the customer site).

FIG. 1 is a block diagram illustrating an exemplary computing device 10 that may be utilized to perform proactive identification of cable network impairments based on telemetry data from CPE devices. The computing device 10 in FIG. 1 comprises a system memory 12 and a processor device 14 that is communicatively coupled to the system memory 12. The computing device 10 of FIG. 1 and the constituent elements thereof may encompass any one of known digital logic elements, semiconductor circuits, processing cores, and/or memory structures, among other elements, or combinations thereof. Examples described herein are not restricted to any particular arrangement of elements, and it is to be understood that some embodiments of the computing device 10 may include more or fewer elements than illustrated in FIG. 1. For example, the processor device 14 may further include one or more functional units, instruction caches, unified caches, memory controllers, interconnect buses, and/or additional memory devices, caches, and/or controller circuits, which are omitted from FIG. 1 for the sake of clarity.

In the example of FIG. 1, the computing device 10 is communicatively coupled (e.g., via a fiber or coaxial connection) to a cable network 16 that is part of a cable network infrastructure 18. The cable network infrastructure 18 includes all physical hardware involved in providing one or more of commercial television services, internet data services, and voice services (e.g., Voice-over-Internet Protocol (VOIP)), as non-limiting examples, to one or more customer sites 20(0)-20(S) within a given geographic area. The cable network infrastructure 18 may be an all-fiber network, an all-coaxial network, or a hybrid fiber-coaxial (HFC) network, or may include the use of other communication media.

The cable network 16 comprises a distribution network that distributes signals throughout the cable network infrastructure 18, and may include, as non-limiting examples, a headend facility (HEF) and other elements not illustrated in FIG. 1 for the sake of clarity. As seen in FIG. 1, the cable network 16 distributes signals to a plurality of hubs 24(0)-24(H), each of which services one or more nodes 26(0)-26(N). Each of the nodes 26(0)-26(N), in turn, utilizes one or more taps 28(0)-28(T) to deliver signals to a plurality of customer sites 20(0)-20(S). The customer sites 20(0)-20(S) may comprise, for instance, homes located within a given region or neighborhood. It is to be understood that, while not shown in FIG. 1, each hub of the plurality of hubs 24(0)-24(H) may service one or more nodes, each node of the plurality of nodes 26(0)-26(N) may service one or more taps, and each tap of the plurality of taps 28(0)-28(T) may service a plurality of customer sites.

Customer sites such as the customer site 20(0) may contain multiple CPE devices 30(0)-30(C) at which signals are ultimately received from the cable network 16, and from which signals may be transmitted back though the cable network infrastructure 18 to the cable network 16. The CPE devices 30(0)-30(C) may include, as non-limiting examples, cable modems, set top boxes, televisions equipped with set top boxes, DOCSIS terminal devices, media terminal adapters (MTA), and the like. Although not shown in FIG. 1, it is to be understood that each of the customer sites 20(0)-20(S) contain one or more CPE devices such as the CPE devices 30(0)-30(C).

Each of the CPE devices 30(0)-30(C), such as the CPE device 30(0), generates a plurality of telemetry parameters, such as telemetry parameters 32(0)-32(T). The telemetry parameters 32(0)-32(T) may comprise, as non-limiting examples, DOCSIS parameters that indicate a quality of a downstream link and/or an upstream link between the cable network 16 and the corresponding CPE device 30(0). The telemetry parameters 32(0)-32(T) may include a downstream RX level parameter, a downstream uncorrectable parameter, a downstream MER parameter, an HPMT parameter, an HPMTM parameter, an upstream uncorrectable parameter, an upstream TX level parameter, a ripple parameter, an FBC parameter, an OFDM parameter, an OFDMA parameter, a T3 timeout parameter, and a T4 timeout parameter, as non-limiting examples. Each of the telemetry parameters 32(0)-32(T) may be associated with a corresponding telemetry threshold 34(0)-34(T) that indicates a threshold above or below which the CPE device 30(0) may experience a cable impairment. Table 1 below provides a more detailed description of exemplary telemetry parameters 32(0)-32(T) and associated exemplary telemetry thresholds 34(0)-34(T) against which the telemetry parameters 32(0)-32(T) may be compared when proactively identifying cable network impairments, according to one embodiment.

TABLE 1

| Telemetry Parameter | Telemetry Parameter Description | Exemplary Telemetry Threshold |
| --- | --- | --- |
| Downstream Receive (RX) Level | Strength of signal provided to customer-premises equipment (CPE) | <−10 dBmV |
| Downstream Uncorrectable | Percentage of uncorrectable codewords received by CPE | >3% |
| Downstream Modulation Error Ratio (MER) | Ratio of average symbol power to average error power, in downstream direction | <30 dB |
| High Post Main Tap (HPMT) | Micro-reflection impairment on CPE as a measure of distance | ≥12 |
| HPMT Magnitude (HPMTM) | Micro-reflection impairment on CPE as a measure of amplitude | >−25 dBmV |
| Upstream Transmit (TX) Level | Upstream signal transmitted from the CPE to the CMTS | >55 dB |
| Upstream Uncorrectable | Measurement of uncorrectable codeword errors in the upstream path generated by cable impairments | ≥5% |
| Ripple | Measurement of impedance mismatch within frequency that causes a reflective wave | ≥6 |
| Full Band Capture (FBC) | Measurement of ability to capture all downstream channels from CPE. | Implementation-specific |
| Orthogonal Frequency Division Multiplexing (OFDM) | Downstream modulation scheme | Implementation-specific |
| Orthogonal Frequency Division Multiple Access (OFDMA) | Upstream modulation scheme | Implementation-specific |

TABLE 1-continued

| Telemetry Parameter | Telemetry Parameter Description | Exemplary Telemetry Threshold |
|---|---|---|
| T3 Timeouts | A count of how many Upstream messages are not being delivered correctly of a set amount of time | Implementation-specific |
| T4 Timeouts | A count of how many Downstream messages are not being delivered correctly of a set amount of time | Implementation-specific |

In addition, an HPMT drop logic threshold 36 and an HPMTM drop logic threshold 38 may be provided for use in "drop logic" for determining whether a cable network impairment is within the customer site 20(0), is between the customer site 20(0) and the cable network infrastructure 18, or within the cable network infrastructure 18 itself. In some embodiments, an HPMT telemetry parameter of the plurality of telemetry parameters 32(0)-32(T) may be considered to fail the HPMT drop logic threshold 36 if the HPMT telemetry parameter has a value of 9, 10, or 11, while an HPMTM telemetry parameter of the plurality of telemetry parameters 32(0)-32(T) may be considered to fail the HPMTM drop logic threshold 38 if the HPMTM telemetry parameter has a value equal to or greater than −15 dBmV, excluding a value of zero (0).

To proactively identify cable network impairments and assign an appropriate maintenance classification, the processor device 14 in the example of FIG. 1 executes a maintenance service 40. While the example of FIG. 1 shows the maintenance service 40 as a process in the system memory 12 executed by the processor device 14, some embodiments may provide that the maintenance service 40 may be implemented as a dedicated hardware circuit of the processor device 14 or as microcode in firmware of the processor device 14. It is to be understood that, because the maintenance service 40 is a component of the computing device 10, functionality implemented by the maintenance service 40 may be attributed to the computing device 10 generally. Moreover, in examples where the maintenance service 40 comprises software instructions that program the processor device 14 to carry out functionality discussed herein, functionality implemented by the maintenance service 40 may be attributed herein to the processor device 14.

In conventional operation, the maintenance service 40 receives the plurality of telemetry parameters 32(0)-32(T) for a CPE device such as the CPE device 30(0) of the customer site 20(0), and also receives corresponding telemetry parameters for other CPE devices among the CPE devices 30(0)-30(C) of the customer site 20(0). The maintenance service 40 then performs an analysis, discussed below in greater detail with respect to FIGS. 2 and 3A-3B, of the plurality of telemetry parameters 32(0)-32(T). Based on the analysis, the maintenance service 40 assigns a maintenance classification 42 that indicates a recommended service technician type for the customer site 20(0). Table 2 below provides a more detailed description of exemplary maintenance classifications and the associated type of service technician recommended for each maintenance classification.

TABLE 2

| Exemplary Maintenance Classification | Description | Service Technician Type |
|---|---|---|
| No Service Required | No customer-premises equipment (CPE) devices have telemetry parameters that fail telemetry thresholds | N/A |
| Partial Home | At least one CPE device at customer site has a telemetry parameter that fail its telemetry threshold | Fulfillment Technician |
| Whole Home | All CPE devices at customer site have a same telemetry parameter that fails its telemetry threshold | Fulfillment Technician |
| Drop Issue | All CPE devices at customer site have a same telemetry parameter that fails its telemetry threshold AND high post main tap (HPMT) and HPMT magnitude (HPMTM) indicate that impairment is on outside of customer site | Fulfillment Technician |
| Plant Issue | All CPE devices at customer site AND one or more neighboring customer sites within a same node have a same telemetry parameter that fails its telemetry threshold | Maintenance Technician |

Figure 2:
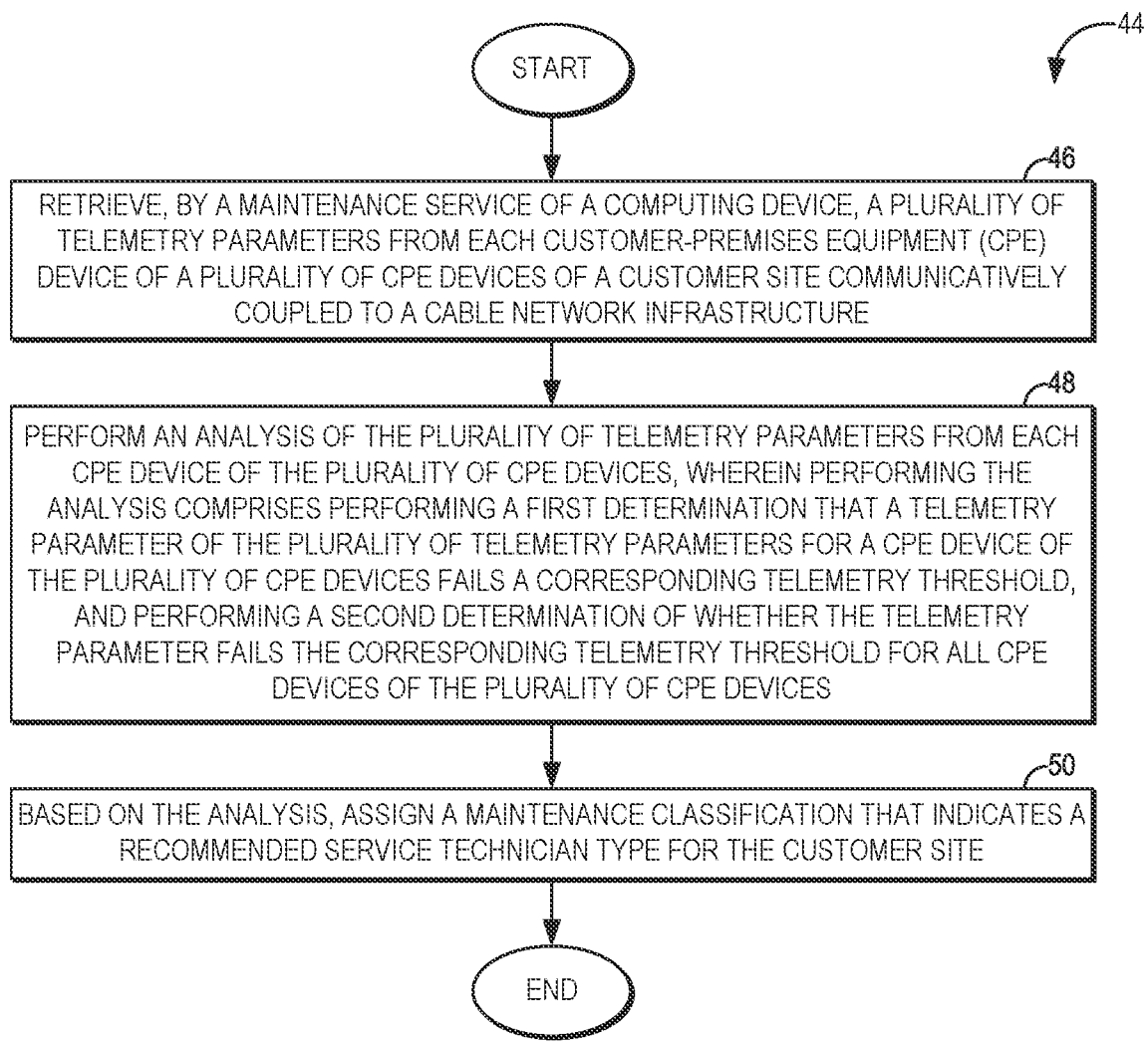
FIG. 2 is a flowchart illustrating exemplary operations of the computing device of FIG. 1 for proactively identifying cable network impairments based on telemetry data from CPE devices, in accordance with some embodiments.

FIG. 2 provides a flowchart 44 to illustrate exemplary operations of the computing device 10 of FIG. 1 for proactively identifying cable network impairments based on telemetry from CPE devices, in accordance with some embodiments. Elements of FIG. 1 are referenced in describing FIG. 2 for the sake of clarity. Operations in FIG. 2 begin with the maintenance service 40 of the computing device 10 retrieving the plurality of telemetry parameters 32(0)-32(T) from each CPE device of the plurality of CPE devices 30(0)-30(C) of the customer site 20(0) communicatively coupled to the cable network infrastructure 18 (block 46). The maintenance service 40 performs an analysis of the plurality of telemetry parameters 32(0)-32(T) from each CPE device of the plurality of CPE devices 30(0)-30(C) (block 48). The operations of block 48 for performing the analysis include include performing a first determination of whether a telemetry parameter (e.g., the telemetry parameter 32(0) of FIG. 1) of the plurality of telemetry parameters 32(0)-32(T) for a CPE device (e.g., the CPE device 30(0) of FIG. 1) of the plurality of CPE devices 30(0)-30(C) fails the corresponding telemetry threshold 34(0). The operations of block 48 for performing the analysis also include performing a second determination of whether the telemetry parameter 32(0) fails the corresponding telemetry threshold 34(0) for all CPE devices of the plurality of CPE devices 30(0)-30(C). The telemetry parameter 32(0) and the corresponding telemetry threshold 34(0) in some embodiments may be any of the telemetry parameters and corresponding telemetry thresholds illustrated in Table 1 above. Based on the analysis, the maintenance service 40 assigns the maintenance classification 42 that indicates a recommended service technician type for the customer site 20(0) (block 50). The maintenance classification 42 in some embodiments may comprise any of the maintenance classifications illustrated in Table 2 above.

Figure 3A:
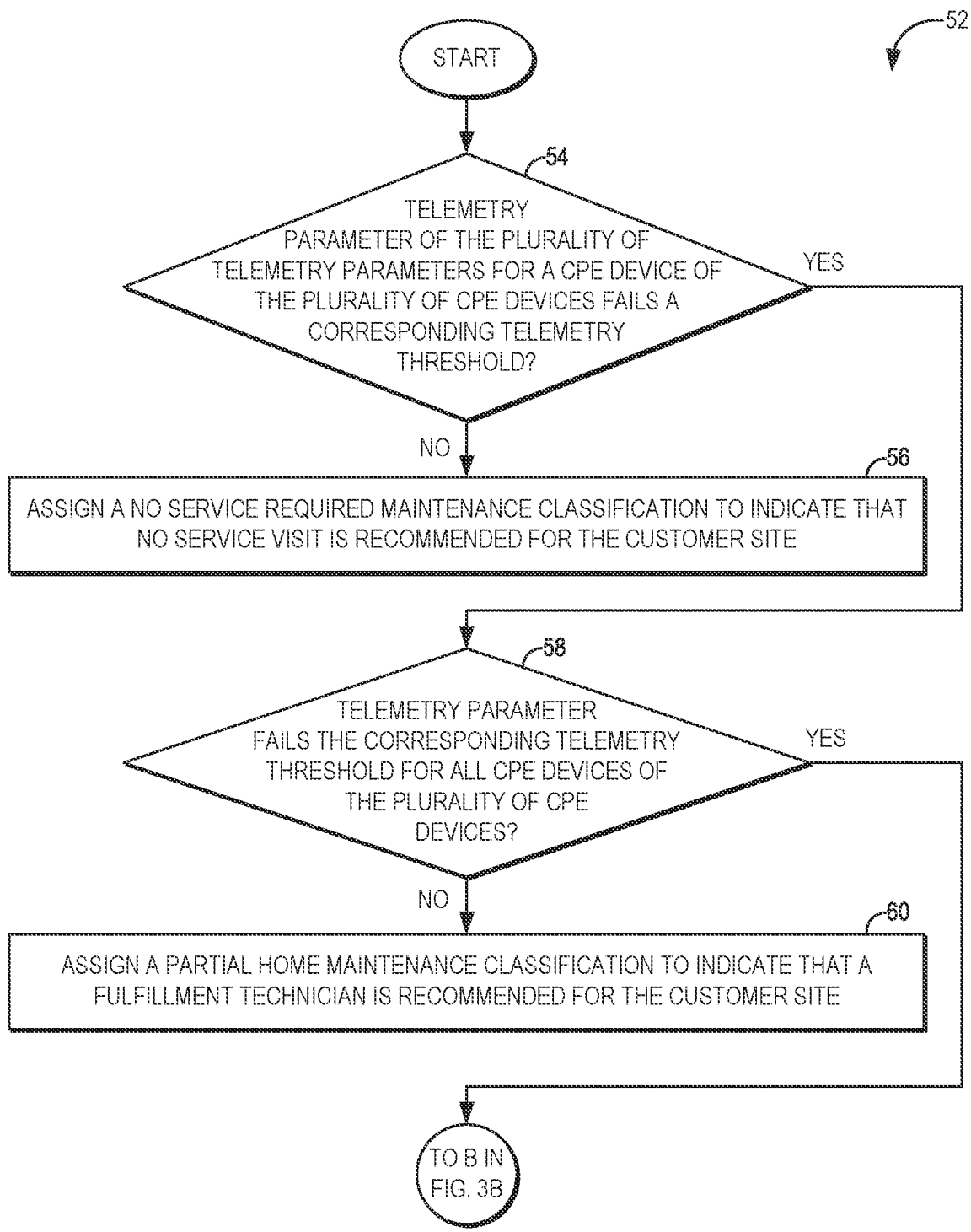
FIGS. 3A and 3B are flowcharts illustrating in greater detail exemplary operations of the computing device of FIG. 1 for analyzing telemetry parameters and assigning maintenance classifications in accordance with some embodiments, in accordance with some embodiments.
Figure 3B:
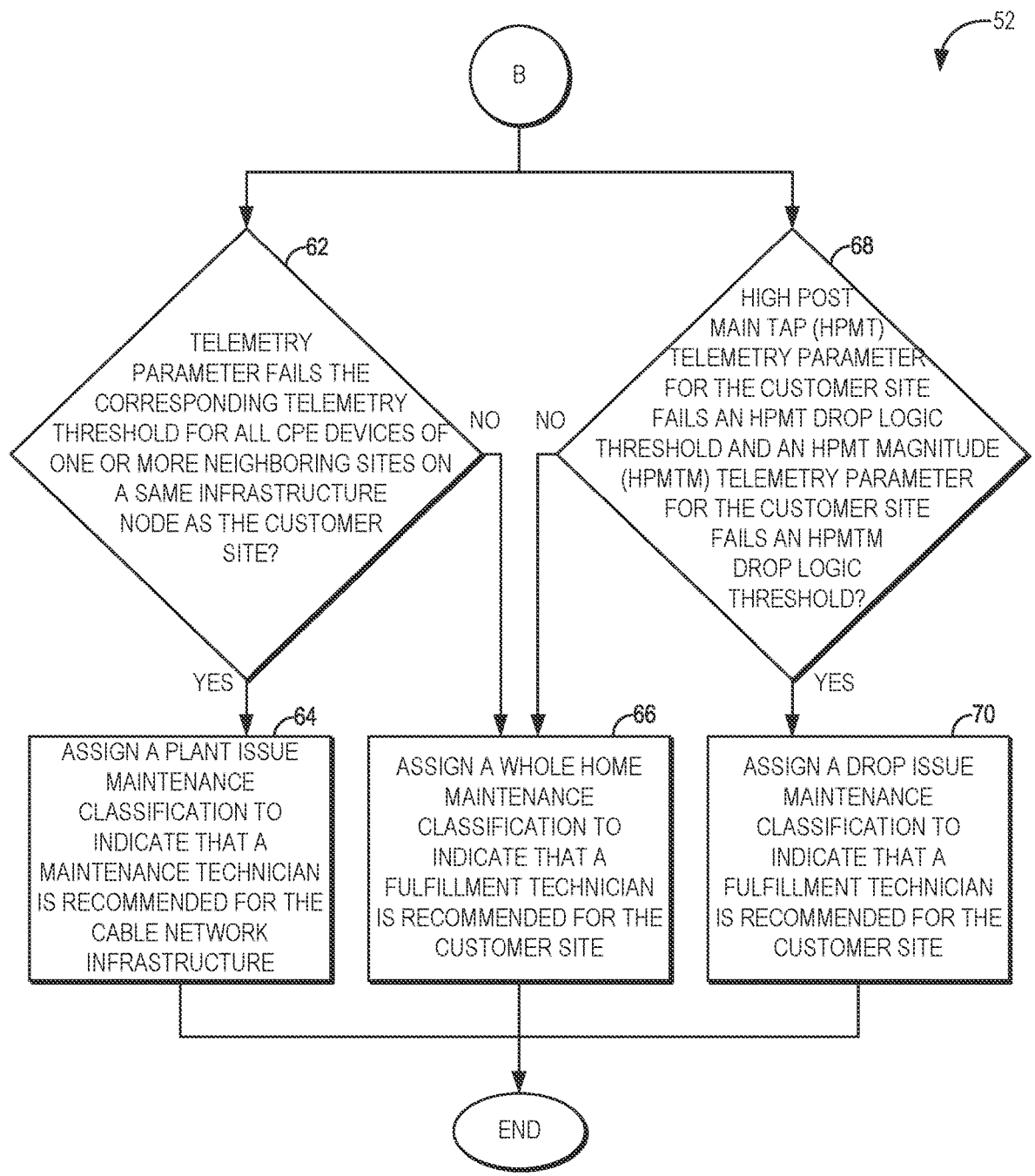

To illustrate in greater detail exemplary operations of the computing device of FIG. 1 for analyzing telemetry parameters and assigning maintenance classifications in accordance with some embodiments, FIGS. 3A and 3B provide a flowchart 52. For the sake of clarity, elements of FIG. 1 are referenced in describing FIGS. 3A and 3B. It is to be understood that one or more of the decision blocks described in FIGS. 3A and 3B may be performed as part of the analysis of telemetry parameters described in block 48 of FIG. 2, and further that one or more of the assignments of the maintenance classification described in FIGS. 3A and 3B may be performed as part of the assignment of the maintenance classification described in block 50 of FIG. 2.

In FIG. 3A, operations begin with the maintenance service 40 of FIG. 1 performing a first determination of whether a telemetry parameter (such as the telemetry parameter 32(0) of FIG. 1) of the plurality of telemetry parameters 32(0)-32 (T) for a CPE device (such as the CPE device 30(0) of FIG. 1) of the plurality of CPE devices 30(0)-30(C) fails the corresponding telemetry threshold 34(0) (block 54). If the first determination evaluates to false, the maintenance service 40 in some embodiments assigns the no service required maintenance classification 42 to indicate that no service visit is recommended for the customer site 20(0) (block 56). However, if the first determination evaluates to true (i.e., the telemetry parameter 32(0) fails the corresponding telemetry threshold 34(0)), the maintenance service 40 next performs a second determination of whether the telemetry parameter 32(0) fails the corresponding telemetry threshold 34(0) for all CPE devices of the plurality of CPE devices 30(0)-30(C) (block 58). If the second determination evaluates to false, the maintenance service 40 according to some embodiments assigns the partial home maintenance classification 42 to indicate that a fulfillment technician is recommended for the customer site 20(0) (block 60). If the maintenance service 40 determines at decision block 58 that the second determination evaluates to true (i.e., the telemetry parameter 32(0) does fail the corresponding telemetry threshold 34(0) for all CPE devices of the plurality of CPE devices 30(0)-30(C)), operations resume at block 62 and/or block 68 of FIG. 3B.

Referring now to FIG. 3B, the maintenance service 40 in some embodiments next performs both a third determination and a fourth determination. The maintenance service 40 performs the third determination of whether the telemetry parameter 32(0) fails the corresponding telemetry threshold 34(0) for all CPE devices of one or more neighboring customer sites (e.g., the customer sites 20(1) and 20(2) of FIG. 1) on a same infrastructure node (i.e., the node 26(0) of FIG. 1) as the customer site 20(0) (block 62). In some embodiments, the one or more neighboring customer sites 20(1) and 20(2) may be selected based on their proximity to the customer site 20(0). Thus, for example, the third determination may be applied to any neighboring sites within 300 feet (as a non-limiting example) of the customer site 20(0), which may encompass the neighboring customer sites 20(1) and 20(2). If the third determination evaluates to true, the maintenance service 40 assigns the plant issue maintenance classification 42 to indicate that a maintenance technician is recommended for the cable network infrastructure 18 (block 64). However, if the third determination evaluates to false, the maintenance service 40 assigns the whole home maintenance classification 42 to indicate that a fulfillment technician is recommended for the customer site 20(0) (block 66).

Similarly, the maintenance service 40 performs the fourth determination of whether an HPMT telemetry parameter for the customer site 20(0) fails an HPMT drop logic threshold 36 and an HPMTM telemetry parameter for the customer site 20(0) fails an HPMTM drop logic threshold 38 (block 68). If the fourth determination evaluates to true, the maintenance service 40 assigns the drop issue maintenance classification 42 to indicate that a fulfillment technician is recommended for the customer site 20(0) (block 70). If the fourth determination evaluates to false, the maintenance service 40 assigns the whole home maintenance classification 42 to indicate that a fulfillment technician is recommended for the customer site 20(0) (block 66).

Figure 4:
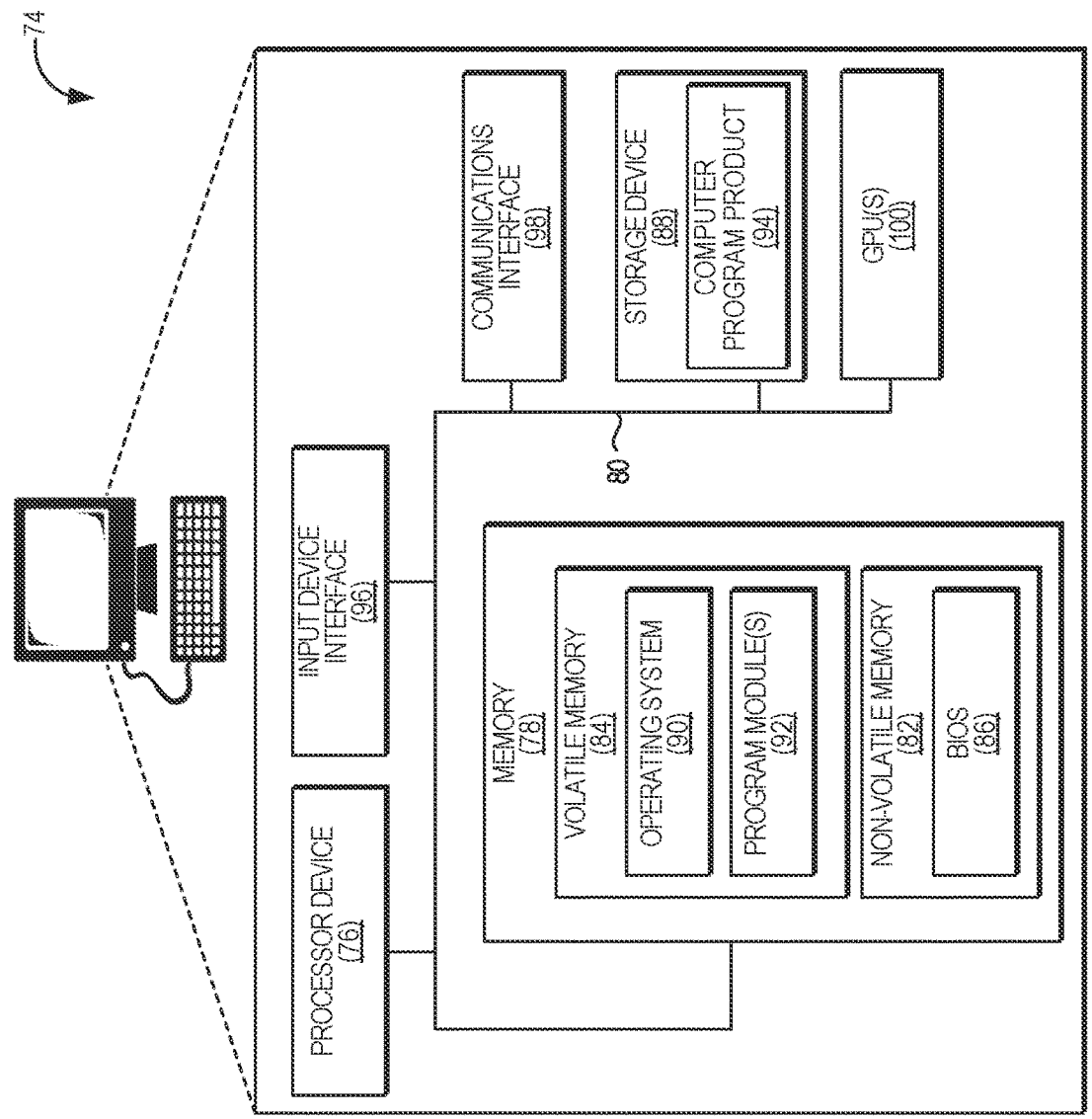
FIG. 4 is a block diagram of a computing device suitable for implementing embodiments disclosed herein.

FIG. 4 is a block diagram of a computing device 74, such as the computing device 10 of FIG. 1, suitable for implementing examples according to one embodiment. The computing device 74 may comprise any computing or electronic device capable of including firmware, hardware, and/or executing software instructions to implement the functionality described herein, such as a computer server or the like. The computing device 74 includes a processor device 76, a memory 78, and a system bus 80. The system bus 80 provides an interface for system components including, but not limited to, the memory 78 and the processor device 76. The processor device 76 can be any commercially available or proprietary processor.

The system bus 80 may be any of several types of bus structures that may further interconnect to a memory bus (with or without a memory controller), a peripheral bus, and/or a local bus using any of a variety of commercially available bus architectures. The memory 78 may include non-volatile memory 82 (e.g., read-only memory (ROM), erasable programmable read-only memory (EPROM), electrically erasable programmable read-only memory (EEPROM), etc.), and volatile memory 84 (e.g., random-access memory (RAM)). A basic input/output system (BIOS) 86 may be stored in the non-volatile memory 82 and can include the basic routines that help to transfer information between elements within the computing device 74. The volatile memory 84 may also include a high-speed RAM, such as static RAM, for caching data.

The computing device 74 may further include or be coupled to a non-transitory computer-readable storage medium such as a storage device 88, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 88 and other drives associated with computer-readable media and computer-usable media may provide non-volatile storage of data, data structures, computer-executable instructions, and the like.

A number of modules can be stored in the storage device 88 and in the volatile memory 84, including an operating system 90 and one or more program modules 92, which may implement the functionality described herein in whole or in part. All or a portion of the examples disclosed herein may be implemented as a computer program product 94 stored on a transitory or non-transitory computer-usable or computer-readable storage medium, such as the storage device 88, which includes complex programming instructions, such as complex computer-readable program code, to cause the processor device 76 to carry out the steps described herein. Thus, the computer-readable program code can comprise software instructions for implementing the functionality of the examples described herein when executed by the processor device 76. The processor device 76 may serve as a controller, or control system, for the computing device 74 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 76 through an input device interface 96 coupled to the system bus 80 but can be connected through other interfaces such as a parallel port, an Institute of Electrical and Electronic Engineers (IEEE) 1394 serial port, a Universal Serial Bus (USB) port, an infrared (IR) interface, and the like.

The computing device 74 may also include a communications interface 98 suitable for communicating with a network as appropriate or desired. The computing device 74 includes one or more graphic processing units (GPUs) 100.

Those skilled in the art will recognize improvements and modifications to the preferred embodiments of the disclosure. All such improvements and modifications are considered within the scope of the concepts disclosed herein and the claims that follow.

What is claimed is:

1. A method, comprising:
retrieving, by a maintenance service of a computing device, a plurality of telemetry parameters from each customer-premises equipment (CPE) device of a plurality of CPE devices of a customer site communicatively coupled to a cable network infrastructure, at least some of the telemetry parameters indicating a current quality of a downstream link or an upstream link between the cable network infrastructure and the corresponding CPE device, a current high post main tap (HPMT) telemetry parameter for the customer site, and a current HPMT magnitude (HPMTM) telemetry parameter for the customer site;
performing an analysis of the plurality of telemetry parameters from each CPE device of the plurality of CPE devices, wherein performing the analysis comprises:
determining that a telemetry parameter of the plurality of telemetry parameters for a first CPE device of the plurality of CPE devices fails a corresponding telemetry threshold; and
responsive to determining that the telemetry parameter for the first CPE device fails the corresponding telemetry threshold, performing a second determination, for all CPE devices of the plurality of CPE devices other than the first CPE device, of whether the telemetry parameter fails the corresponding telemetry threshold;
responsive to determining that the second determination evaluates to true, performing a third determination of whether the HPMT telemetry parameter for the customer site fails an HPMT drop logic threshold and the HPMTM telemetry parameter for the customer site fails an HPMTM drop logic threshold; and
responsive to the third determination evaluating to true, assigning a maintenance classification that indicates a drop issue problem exists at the customer site.

2. The method of claim 1, wherein the plurality of telemetry parameters comprises one or more of a downstream receive (RX) level parameter, a downstream uncorrectable parameter, a downstream Modulation Error Ratio (MER) parameter, an upstream uncorrectable parameter, an upstream transmit (TX) level parameter, a ripple parameter, a Full Band Capture (FBC) parameter, an Orthogonal Frequency Division Multiplexing (OFDM) parameter, an Orthogonal Frequency Division Multiple Access (OFDMA) parameter, a T3 timeout parameter, and a T4 timeout parameter.

3. A computing device, comprising:
a system memory; and
a processor device communicatively coupled to the system memory;
the processor device configured to:
retrieve a plurality of telemetry parameters from each customer-premises equipment (CPE) device of a plurality of CPE devices of a customer site communicatively coupled to a cable network infrastructure, at least some of the telemetry parameters indicating a current quality of a downstream link or an upstream link between the cable network infrastructure and the corresponding CPE device, a current high post main tap (HPMT) telemetry parameter for the customer site, and a current HPMT magnitude (HPMTM) telemetry parameter for the customer site;
perform an analysis of the plurality of telemetry parameters from each CPE device of the plurality of CPE devices by being configured to:
determine that a telemetry parameter of the plurality of telemetry parameters for a first CPE device of the plurality of CPE devices fails a corresponding telemetry threshold; and
responsive to determining that the telemetry parameter for the first CPE device fails the corresponding telemetry threshold, perform a second determination, for all CPE devices of the plurality of CPE devices other than the first CPE device, of whether the telemetry parameter fails the corresponding telemetry threshold;
in response to determining that the telemetry parameter fails the corresponding telemetry threshold for each of the plurality of CPE devices:
retrieve, by a maintenance service, the telemetry parameter from each CPE device of a plurality of CPE devices of a neighboring customer site communicatively coupled to the cable network infrastructure on a same infrastructure node as the customer site;
perform an analysis of the telemetry parameter from each CPE device of the plurality of CPE devices of the neighboring customer site; and
determine that the telemetry parameter for the plurality of CPE devices of the neighboring customer site does not fail the corresponding telemetry threshold;
in response to determining that the telemetry parameter fails the corresponding telemetry threshold for the plurality of CPE devices of the customer site and that the telemetry parameter does not fail the corresponding telemetry threshold for the plurality of CPE devices of the neighboring customer site, perform a third determination of whether the HPMT telemetry parameter for the customer site fails an HPMT drop logic threshold and the HPMTM telemetry parameter for the customer site fails an HPMTM drop logic threshold; and
responsive to the third determination evaluating to true, assign a maintenance classification to indicate that a technician is recommended for the customer site to address a drop issue that affects the customer site.

4. The computing device of claim 3, wherein the plurality of telemetry parameters comprises one or more of a downstream receive (RX) level parameter, a downstream uncorrectable parameter, a downstream Modulation Error Ratio (MER) parameter, an upstream uncorrectable parameter, an upstream transmit (TX) level parameter, a ripple parameter, a Full Band Capture (FBC) parameter, an Orthogonal Frequency Division Multiplexing (OFDM) parameter, an Orthogonal Frequency Division Multiple Access (OFDMA) parameter, a T3 timeout parameter, and a T4 timeout parameter.

5. A non-transitory computer-readable medium having stored thereon computer-executable instructions which, when executed by a processor device, cause the processor device to:
- retrieve a plurality of telemetry parameters from each customer-premises equipment (CPE) device of a plurality of CPE devices of a customer site communicatively coupled to a cable network infrastructure, at least some of the telemetry parameters indicating a current quality of a downstream link or an upstream link between the cable network infrastructure and the corresponding CPE device, a current high post main tap (HPMT) telemetry parameter for the customer site, and a current HPMT magnitude (HPMTM) telemetry parameter for the customer site;
- perform an analysis of the plurality of telemetry parameters from each CPE device of the plurality of CPE devices by causing the processor device to:
  - determine that a telemetry parameter of the plurality of telemetry parameters for a first CPE device of the plurality of CPE devices fails a corresponding telemetry threshold; and
  - responsive to determining that the telemetry parameter for the first CPE device fails the corresponding telemetry threshold, perform a second determination, for all CPE devices of the plurality of CPE devices other than the first CPE device, of whether the telemetry parameter fails the corresponding telemetry threshold;
- in response to determining that the telemetry parameter fails the corresponding telemetry threshold for each of the plurality of CPE devices:
  - retrieve, by a maintenance service, the telemetry parameter from each CPE device of a plurality of CPE devices of a neighboring customer site communicatively coupled to the cable network infrastructure on a same infrastructure node as the customer site;
  - perform an analysis of the telemetry parameter from each CPE device of the plurality of CPE devices of the neighboring customer site; and
  - determine that the telemetry parameter for the plurality of CPE devices of the neighboring customer site does not fail the corresponding telemetry threshold;
- in response to determining that the telemetry parameter fails the corresponding telemetry threshold for the plurality of CPE devices of the customer site and that the telemetry parameter does not fail the corresponding telemetry threshold for the plurality of CPE devices of the neighboring customer site, perform a third determination of whether the HPMT telemetry parameter for the customer site fails an HPMT drop logic threshold and the HPMTM telemetry parameter for the customer site fails an HPMTM drop logic threshold; and
- responsive to the third determination evaluating to true, assign a maintenance classification to indicate that a technician is recommended for the customer site to address a drop issue that affects the customer site.

6. The non-transitory computer-readable medium of claim 5, wherein the plurality of telemetry parameters comprises one or more of a downstream receive (RX) level parameter, a downstream uncorrectable parameter, a downstream Modulation Error Ratio (MER) parameter, an upstream uncorrectable parameter, an upstream transmit (TX) level parameter, a ripple parameter, a Full Band Capture (FBC) parameter, an Orthogonal Frequency Division Multiplexing (OFDM) parameter, an Orthogonal Frequency Division Multiple Access (OFDMA) parameter, a T3 timeout parameter, and a T4 timeout parameter.

* * * * *